June 22, 1965  N. R. RICHMOND  3,190,113
ELECTRO-MECHANICAL TORQUE SENSING DEVICE AND METHOD
Filed Nov. 28, 1962  2 Sheets-Sheet 1

*INVENTOR.*
NELSON R. RICHMOND

BY *Teller, McCormick, Paulding & Huber*
ATTORNEYS

_United States Patent Office_ 3,190,113
Patented June 22, 1965

3,190,113
ELECTRO-MECHANICAL TORQUE SENSING
DEVICE AND METHOD
Nelson R. Richmond, Thompsonville, Conn., assignor to Kaman Aircraft Corporation, Bloomfield, Conn., a corporation of Connecticut
Filed Nov. 28, 1962, Ser. No. 240,676
19 Claims. (Cl. 73—136)

This invention relates to the sensing and measuring of periodically varying loads or deflections, and deals more particularly with a device and method which utilize an electromechanical transducer to detect variations in the deflection of a part of a torque transmitting mechanism for the purpose of providing an indication of the amount of torque transmitted through the mechanism or other quantity related to the amplitude or frequency of the detected deflection.

The general object of the present invention is to provide a device and method for accurately and conveniently measuring the torque transmitted through a rotary mechanism such as a gearbox connecting an engine with a given load.

A more specific object of the invention is to provide a torque measuring device of the foregoing character which is of simple rugged construction, which may be attached to the outside of the gearbox or other mechanism with which it is used, and which requires no additional or special parts inside the gearbox or other mechanism.

A still more specific object of the invention is to provide a torque measuring device of the foregoing character which device functions by sensing the deflections of a part of the gearbox or other mechanism which deflects periodically with an amplitude of deflection related to the transmitted torque and which device produces an A.C. output voltage related to the torque.

Another object of the present invention is to provide a device adapted for attachment to a rotary torque transmitting mechanism and capable of measuring the amount of torque transmitted through said mechanism, the frequency of rotation of one of the parts of said mechanism, or both the torque and frequency of rotation. In keeping with this object, another object of the invention is to provide a means for integrating the torque and frequency signals produced by said latter device to obtain an indication of the power transmitted through said mechanism.

Another object of the present invention is to provide an electro-mechanical sensing device particularly adapted for use with a planetary gearbox for measuring the deflection of one point of the ring gear relative to two other points while the gearbox is in operation, and which device may be used to measure the torque transmitted through the gearbox, the speed of rotation of one of the parts, the power transmitted through the gearbox, or for testing or inspection purposes to provide an indication of the amount of ring gear deflection produced by each individual planet gear thereby disclosing undersized or oversized gears or other faults in construction.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

The electro-mechanical sensing device and method of the present invention are useful in connection with various different mechanisms where a torque is transmitted to a rotating shaft or the like and wherein one part of the mechanism deflects periodically with an amplitude related to the torque. In order to facilitate an understanding of the invention the drawings show, and the following specification describes, a device embodying the invention as attached to the main rotor transmission or gearbox of a helicopter. It is to be understood however, that the invention should not be construed as limited either in scope or usefulness to the illustrated embodiment or description.

Figure 1:
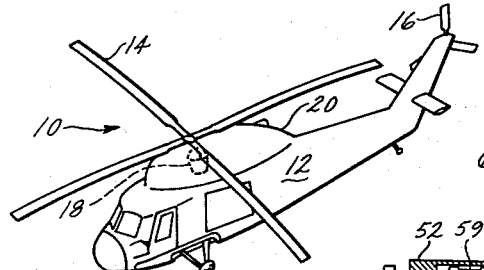
FIG. 1 is a perspective view of a helicopter containing a torque transmitting mechanism, shown dotted, to which a sensing device embodying the present invention may be attached.

Referring now to the drawings, FIG. 1 shows a helicopter 10, with a main body or fuselage 12, a main rotor 14, and a tail rotor 16. The dotted lines immediately below the main rotor represent the main rotor gearbox 18. The gearbox 18 and other parts of the rotor device are located within a fairing 20 atop the fuselage 12, their arrangement being best illustrated in FIG. 2. This figure shows the main power plant 22 of the helicopter in broken lines. Associated with the power plant is a speed reducer 24 and an output drive shaft 26 which connects the power plant to the gearbox 18. Below the engine drive shaft is a tail rotor shaft 28, which supplies the tail rotor 16 with power for directional control of the helicopter. The present invention is not primarily concerned with the details of the helicopter drive system except for the gearbox 18.

Figure 2:
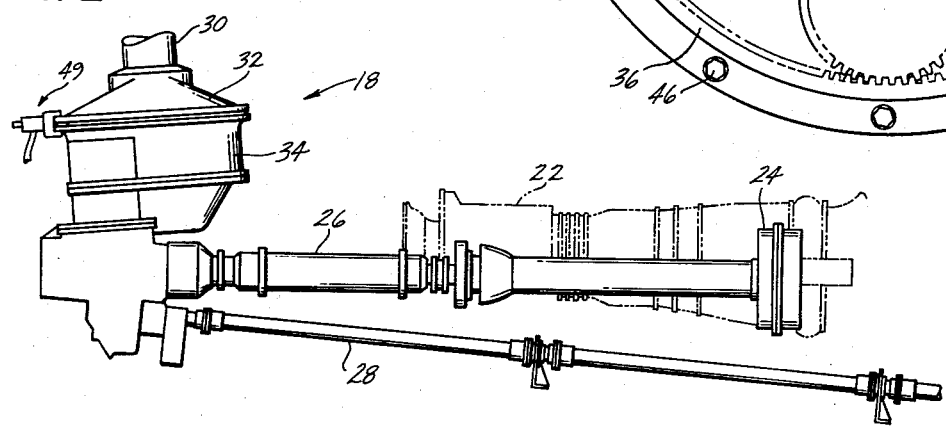
FIG. 2 is a side elevational view showing in more detail the torque transmitting mechanism and the main power plant of the helicopter of FIG. 1, the torque transmitting mechanism having attached thereto a sensing device embodying the present invention.

As shown in FIG. 2 a drive shaft 30 projects upwardly from the gearbox 18. This shaft constitutes the drive shaft for the main rotor and is the driven or output member of the gearbox 18. At its upper end the shaft 30 is connected with the rotor hub by conventional means not shown. The gears and other moving parts of the gearbox are contained in a housing comprising an upper casing 32 and a lower casing 34.

Figure 3:
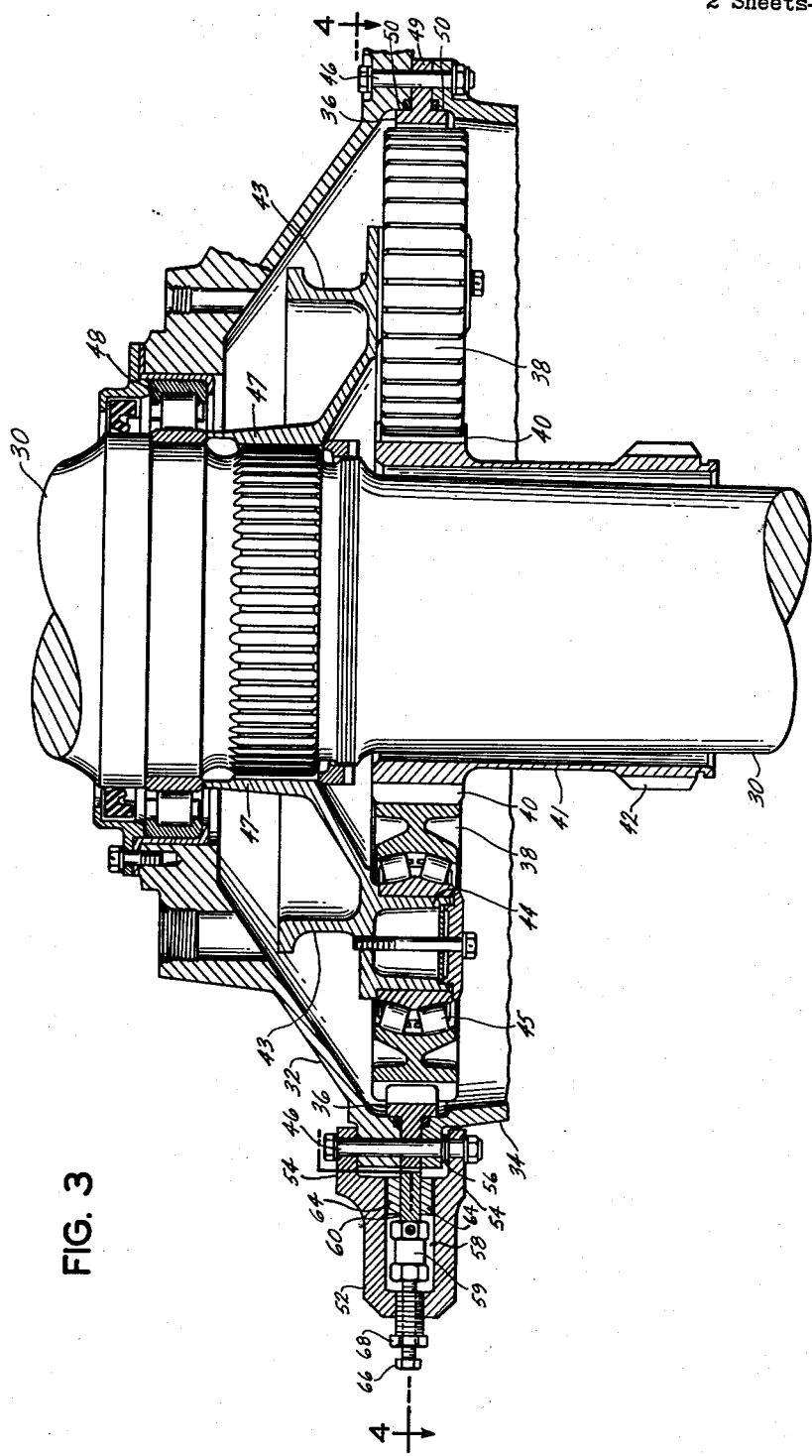
FIG. 3 is an enlarged fragmentary vertical section view taken through the planetary gearbox comprising part of the torque transmitting mechanism of FIG. 2.

The gearbox 18 is of the planetary gear type and includes a stationary ring gear 36 fixedly held between said casings 32 and 34 as best shown in FIG. 3. A set of six planet gears 38, 38 mesh with the ring gear 36 and also with a sun gear 40 which surrounds the rotor drive shaft 30 and which is integral with a hollow shaft 41. The shaft 41 constitutes the input or driving member of the planetary gear train and is splined at its lower end 42 for connection with the drive shaft 26 through other parts of the gearbox not shown and not essential to an understanding of the present invention. The planet gears 38, 38 are supported for rotation about their central axes by a planet carrier 43 which includes a journal 44 and an anti-friction bearing 45 for each individual planet gear 38. The planet carrier 43 extends upwardly and inwardly from the planet gears as shown in FIG. 3 and is splined at its upper end portion 47 to the rotor drive shaft 30 so that rotation of the planet carrier is imparted to the rotor drive shaft. The shaft 30 is supported for rotation relative to the supper casing 32 by a bearing unit 48 and is also supported at its lower end relative to the lower casing by another suitable bearing or bearings not shown.

Figure 4:
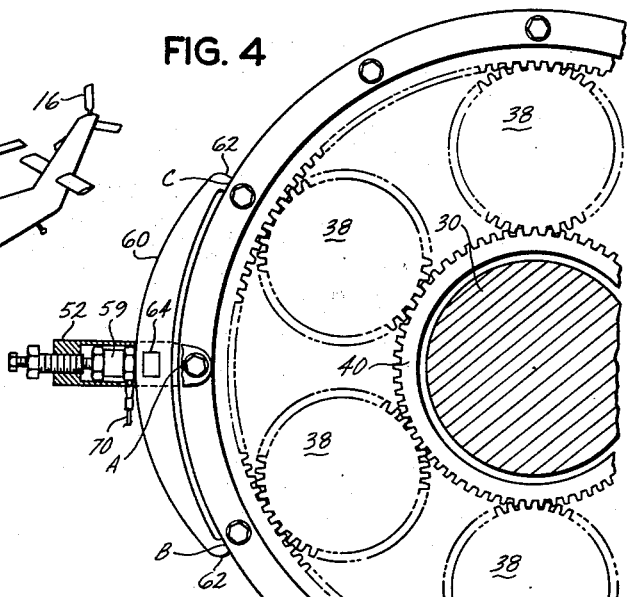
FIG. 4 is a fragmentary horizontal sectional view taken on the line 4—4 of FIG. 3 and drawn on a scale somewhat reduced from that of FIG. 3.

The upper and lower casings 32 and 34 of the gearbox are bolted together, as shown in FIGS. 3 and 4, by a plurality of bolts 46, 46 which also pass through openings in a radial flange 49 on the ring gear 36. In radial cross section as shown in FIG. 3 the ring gear is T-shaped so as to provide two outwardly facing circumferential surfaces 50, 50 one on either side of the flange 49 which engage corresponding surfaces on the casings 32 and 34 respectively. As a result the ring gear is held firmly fixed between the two casings and any deflction of the ring gear as a result of rotation of the planet gears is also imparted to the casings 32 and 34.

It is a general characteristic of planetary gear trains that the planet gears react with the ring gear in transmitting torque from the sun gear to the planet carrier and by virtue of loads imposed on the ring gear cause distortion or deflection of the same. The nature of the loads applied to the ring gear is such as to cause the segment of the gear located between two adjacent planets to straighten. For example, at the instant shown in FIG. 4 the points B and C on the ring gear are each located radially outwardly from one of two adjacent planet gears 38, 38 and the point A is located midway between the same two gears. Since there are six planet gears the points B and C are angularly separated by 60° and the point A is located 30° from both the points B and C. The forces imposed on the ring gear are therefore such as to cause the ring gear segment between the points B and C to straighten with the result that the point A is moved radially inwardly toward the central axis. Each point on the ring gear reaches its minimum displacement from the central axis when located substantially midway between two adjacent planet gears and reaches its maximum displacement from the central axis when located in radial alignment with a planet gear. Therefore in FIG. 4 the point A is located a minimum distance and the points B and C a maximum distance from the central axis. It should be understood, however, that the motions involved are very small. Even under full load conditions the range of motion of each point may be on the order of only several thousandths of an inch or less. Due to the motion of the planet carrier and the passage of the planets in succession past each point on the ring gear, each point deflects periodically between its maximum and minimum points at a frequency related to the speed of rotation of the planet carrier and main rotor drive shaft. In the present case where there are six planet gears, the frequency of the deflection of each point is equal to six times the rotational frequency of the rotor drive shaft. It will also be appreciated that the amplitude of the deflection will be directly related to the amount of torque transmitted through the gear train to the rotor drive shaft, larger torques imposing greater forces on the ring gear and thereby causing greater periodic distortion. It is therefore seen that by measuring the magnitude and frequency of the radial deflction of any point on the ring gear relative to the central axis, significant information may be obtained as to the operating conditions of the gearbox.

In accordance with the present invention a measurement of the deflection is produced through the use of an electromechanical transducer adapted to convert the periodic deflection into an alternating voltage signal having a frequency equal to the frequency of the deflection and an amplitude directly related to the amplitude of the deflection. This signal may then be rectified or otherwise used to provide an indication of the transmitted torque and also used to provide an indication of the speed of rotation. If two signals, such as voltage signals, are produced from the first voltage signal—one a function of the amplitude and related to the torque and the other a function of the frequency and related to the speed of rotation—they may be combined or integrated to provide an indication of the power supplied to the main rotor or passing through the gearbox.

Various different transducers for sensing the deflection may be used and they may be connected to the gearbox or other mechanisms in various different ways without departing from the broader aspects of the invention. As mentioned, the deflection to be sensed in the illustrated case is the motion of a given point radially relative to the central axis of the gearbox and this would seem to imply that at least one part of the sensing device should be fixed relative to the central axis. The illustrated and preferred sensing device, however, is adapted for attachment directly and only to the ring gear and requires no part fixed relative to the central axis. In essence, the principle of this device is its attachment to the ring gear at three points, two of which deflect in phase with each other and 180° out of phase with the third. The transducer then senses the deflection of the third point relative to the first two. This not only has the advantage of simplifying the device and its attachment to the gearbox, but also substantially doubles the sensitivity of the device since the amplitude of the deflection of the third point relative to the other two points is double its amplitude of deflection relative to the central axis.

Referring to FIGS. 3 and 4 for a more detailed description of the sensing device, the device as illustrated includes a housing or frame 52 adapted for connection to the ring gear and gearbox casings 32 and 34 at the point A. At its inner end the frame 52 includes two arms 54, 54 which straddle the casing flanges disposed on opposite sides of the ring gear flange 49. These arms are apertured and receive a bolt 46 which passes through the arms and through the flanges of the casings and the ring gear. As shown in FIG. 3 a spacer or washer 56 is provided between the lower arm 54 and the flange of the casing 34 so that the nut on the associated bolt 46 may be tightened to aid in clamping the ring gear flange 49 between the two casing flanges.

Outwardly from the two arms 54, 54, the frame 52 is provided with a hollow bore 58 which is closed at its outer end and which receives an electro-mechanical transducer 59. The transducer 59 is a load cell of the type which produces an alternating voltage signal or the like having an amplitude generally proportional to the amplitude of an oscillating or variable force or load applied across its ends and a frequency equal to the frequency of the load. The device is very stiff so as not to deflect any appreciable amount as a result of the loads applied thereto. Preferably the transducer is of the type employing a piezoelectric crystal. One suitable transducer is distributed by Endevco Corporation, 801 South Arroyo Parkway, Pasadena, California, and is referred to as Model 2103.

Extending between the arms 54, 54 of the frame 52 is a bow spring 60 having a generally rectangular cross section as shown in FIG. 3. The spring is curved so as to be substantially arcuate with respect to the central axis of the gearbox and at either end is provided with feet 62, 62 which engage the ring gear at the points B and C respectively and which hold the body of the spring some distance outwardly from the ring gear. The bore of the frame 52 is substantially rectangular in cross section and at its midpoint the spring 60 has cemented thereto two pads 64, 64 which are located on opposite sides of the spring and which engage opposite walls of the frame bore to prevent the spring from moving vertically as viewed in FIG. 3.

The load cell 59 is held axially in place in the bore 58 of the frame 52 by engagement at one end with the midpoint of the outer surface of the spring 60 and by engagement at its other end with an adjusting screw 66. The latter screw 66 constitutes a coarse adjustment and is threaded through a larger screw 68. The latter screw constitutes a fine adjustment by virtue of its differential pitch in relation to screw 66, and is threadably received in the outer end wall of the frame 52. From this it is seen that the frame 54 serves to hold the load cell firmly against the bow spring and that the bow spring will be distorted in accordance with the deflection of the point A relative to the points B and C. That is, the screws 66 and 68 are so adjusted that the load cell 59 preloads the spring 60 to the point where the spring remains in firm contact with the ring gear at the points B and C and with the inner end of the transducer at all times during the operation of the gearbox. The spring 60 therefore imposes a spring load or force on the transducer 59 which varies in accordance with the motion of the point A relative to the points B and C.

It is therefore seen from the above description that the illustrated device operates by converting the displacement of the point A relative to the points B and C into a spring force which is then measured and converted into an alternating voltage signal by the transducer 59. The frequency of the alternating voltage signal produced by the load cell 59 is equal to the frequency of the motion of the point A relative to the points B and C. The points B and C deflect in phase with each other so that the ends of the bow spring move in unison and in the same direction. The point A deflects 180° out of phase with the points B and C so as to always move in the opposite direction to the points B and C. The total distortion of the spring is therefore approximately double the deflection of the point A relative to the central axis and the total change in spring force therefore is approximately double the change which would be obtained if the spring distorted by an amount equal to the deflection of the point A relative to the central axis.

Figure 5:
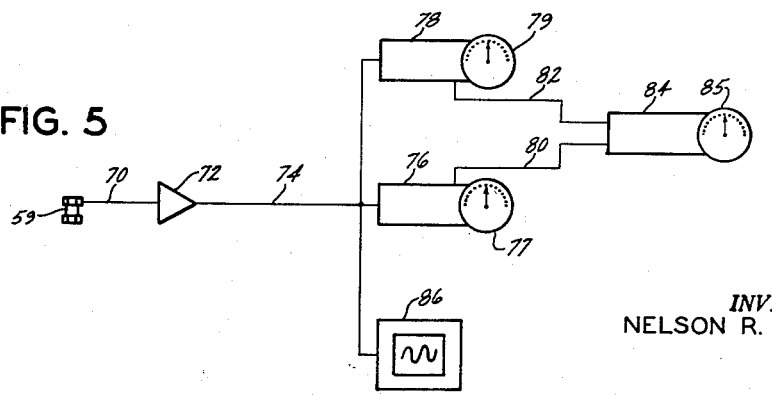
FIG. 5 is a block diagram illustrating schematically the electrical circuitry of the sensing device embodying the present invention.

The output from the load cell, as shown in FIG. 5, is transmitted by a line 70 to electrical devices for converting the load cell signal into other signals or visual indications representative of the torque or other parameters desired. In the device shown in FIG. 5 the line 70 constitutes the input to an amplifier 72 which produces an amplified version of the load cell signal. This amplified signal is transmitted in turn by a line 74 to a rectifier 76 which rectifies the amplified signal to produce a rectified or D.C. signal having a voltage level related to the torque transmitted through the gearbox. This signal may in turn be used to actuate an indicator 77 located in the cockpit of the helicopter and calibrated to read directly in terms of the torque. Also associated with the amplifier 72 and receiving the amplified output signal appearing on the line 74 is another device 78 for producing an output signal related to the frequency of the amplified signal and therefore related to the r.p.m. of the rotor drive shaft 30. Associated with the device 78 is an indicator 79 which may be located in the cockpit of the helicopter and calibrated to read directly in terms of main rotor r.p.m. The two output signals produced by the devices 76 and 78 are also transmitted by lines 80 and 82 respectively to a suitable device 84 for integrating said two output signals and for thereby producing another signal related to the power transmitted through the gear box. The latter signal is or may be used to actuate an associated indicator 85 located in the cockpit of the helicopter and calibrated to read directly in terms of power.

The amplified output signal appearing on the line 74 may also be transmitted as shown in FIG. 5 to an oscilloscope 86 or other similar device for visually representing the output voltage signal. By means of this device the amplitude and frequency of the signal may be obtained by direct observation to provide an indication of the torque and speed imparted to the main rotor shaft. Additionally the device 86 may be used as an inspection device for visually observing the deflection of the ring gear produced by each of the planet gears 38, 38. As each planet gear passes the points A, B and C on the ring gear it produces a trace on the oscilloscope which is usually different, at least in some minor respects, from the traces produced by the other planet gears. In other words, each planet gear produces its own individual signature or trace on the oscilloscope, and so by properly interpreting the traces produced by each planet gear the oscilloscope 86 may be used to detect possible faults in the gearbox such as slightly undersized or oversized planet gears.

The invention claimed is:

1. A device for measuring the amount of torque transmitted through a mechanism having a part which deflects periodically with an amplitude of deflection related to the transmitted torque, said device comprising an electromechanical transducer adapted to sense said deflection and to produce an alternating output voltage signal with an amplitude related to said deflection, and means for rectifying said output voltage signal to produce a D.C. voltage signal representative of the amount of transmitted torque.

2. A device as defined in claim 1 which device further comprises an indicator responsive to said D.C. voltage signal for providing a visual indication of the amount of transmitted torque.

3. A device as defined in claim 1 wherein said transducer comprises a piezo-electric crystal type load cell.

4. A device for use with a torque transmitting mechanism having a part which deflects periodically with an amplitude of deflection related to the transmitted torque and with a frequency of deflection related to the rotational speed of one member of said mechanism, said device comprising an electro-mechanical transducer adapted to sense said deflection and to produce an alternating output voltage signal with an amplitude related to said deflection and a frequency related to the rotational speed of said one member, means for producing a first signal related to the amplitude of said output voltage signal, means for producing a second signal related to the frequency of said output voltage signal, and means for integrating said first and second signals to produce a third signal related to both said amplitude and frequency and thereby to the power transmitted through said mechanism.

5. A device for use with a torque transmitting mechanism having an annular member the points of which periodically deflect radially relative to a given axis with an amplitude of deflection related to the torque transmitted through said mechanism and with a frequency of deflection related to the rotational speed of one member of said mechanism, said device comprising a first part mounted for engagement and movement with one point of said annular member and a second part mounted for engagement and movement with two other points of said annular member, and a transducer connected between said first and second parts for producing and alternating output voltage signal with an amplitude and frequency related to the amplitude and frequency of the deflection of said one point relative to said two other points.

6. A device as defined in claim 5 said second part being so constructed and arranged as to engage said annular member at two points which deflect approximately in phase with each other and approximately 180° out of phase with respect to said one point.

7. A device as defined in claim 5 further characterized by means for rectifying said output voltage signal to produce a D.C. voltage signal representative of the amount of transmitted torque.

8. A device as defined in claim 5 further characterized by means for producing a signal related to the frequency of said output voltage signal.

9. A device as defined in claim 5 further characterized by means for producing a first signal related to the amplitude of said output voltage signal, means for producing a second signal related to the frequency of said output voltage signal, and means for integrating said first and second signals to produce a third signal related to both said amplitude and frequency and thereby to the power transmitted through said mechanism.

10. A device for use with a torque transmitting mechanism having an annular member the points of which periodically deflect radially relative to the central axis thereof with an amplitude of deflection related to the torque transmitted through said mechanism, said device comprising a load cell of the type which produces an alternating output signal related in amplitude and frequency to the amplitude and frequency of an alternating force applied across its ends, means fixing one end of said load cell relative to one point on said annular member, and means engaging the other end of said load cell and two points on said annular member angularly spaced from said one point, said means including a spring arranged so as to exert a spring force between said one end of said load cell and said two points on said annular member whereby radial movement of said one point relative to said two points is converted into a change in the spring force acting on said load cell.

11. A device for use with a torque transmitting mechanism having an annular member the points of which periodically deflect radially relative to the central axis thereof with an amplitude of deflection related to the torque transmitted through said mechanism, said device comprising a load cell of the type which produces an alternating output signal related in amplitude and frequency to the amplitude and frequency of an alternating force applied across its ends, a bow spring having two ends adapted to engage said annular member at two angularly spaced points, and a frame adapted for rigid attachment to said annular member at a point located between said two angularly spaced points and for holding said load cell firmly against the outer surface of said bow spring, said frame and said bow spring cooperating to apply a force across the ends of said load cell.

12. A device for use with a planetary gearbox having a ring gear which meshes with a plurality of equally angularly spaced planet gears supported by a planet gear carrier, said device comprising a load cell of the type which produces an alternating output signal related in amplitude and frequency to the amplitude and frequency of an alternating force applied across its ends, a bow spring having two ends adapted to engage said ring gear at two angularly spaced points, and a frame adapted for rigid attachment to said ring gear at a point located between said two angularly spaced points and for holding said load cell firmly against the outer surface of said bow spring, said frame and said bow spring cooperating to apply a force across the ends of said load cell.

13. A device as defined in claim 12 further characterized by said bow spring being of such a size as to engage said ring gear at two points angularly separated by an angle equal to the angular separation of said planet gears on said carrier.

14. A device as defined in claim 12 further characterized by said adjusting means for moving said load cell relative to said frame to vary the preload on said spring.

15. A device as defined in claim 12 further characterized by means for rectifying the output signal from said load cell to produce a D.C. voltage signal representative of the torque transmitted by said gearbox.

16. A device as defined in claim 15 further characterized by an indicator responsive to said D.C. voltage signal for providing a visual indication of the amount of transmitted torque.

17. A device as defined in claim 12 further characterized by means for producing a signal relating to the frequency of the output from said load cell.

18. A device as defined in claim 12 further characterized by means for producing a first signal related to the amplitude of the output of said load cell, means for producing a second signal related to the frequency of said output of said load cell, and means for integrating said first and second signals to produce a third signal related to the power transmitted through said device.

19. The method of measuring the amount of torque transmitted through a mechanism having a part which deflects periodically with an amplitude of deflection related to the transmitted torque, said method comprising the steps of rigidly attaching a transducer to said part to sense said deflection and to produce an alternating voltage related to said deflection, and rectifying said alternating output voltage to produce a D.C. voltage related to said torque.

References Cited by the Examiner

UNITED STATES PATENTS 2,468,875   5/49   Henrikson _____ 33—174
2,769,929   11/56  Hardway _____ 73—71.4 X

FOREIGN PATENTS 1,077,441   3/60   Germany.

RICHARD C. QUEISSER, *Primary Examiner.*
JOSEPH P. STRIZAK, *Examiner.*